UNITED STATES PATENT OFFICE.

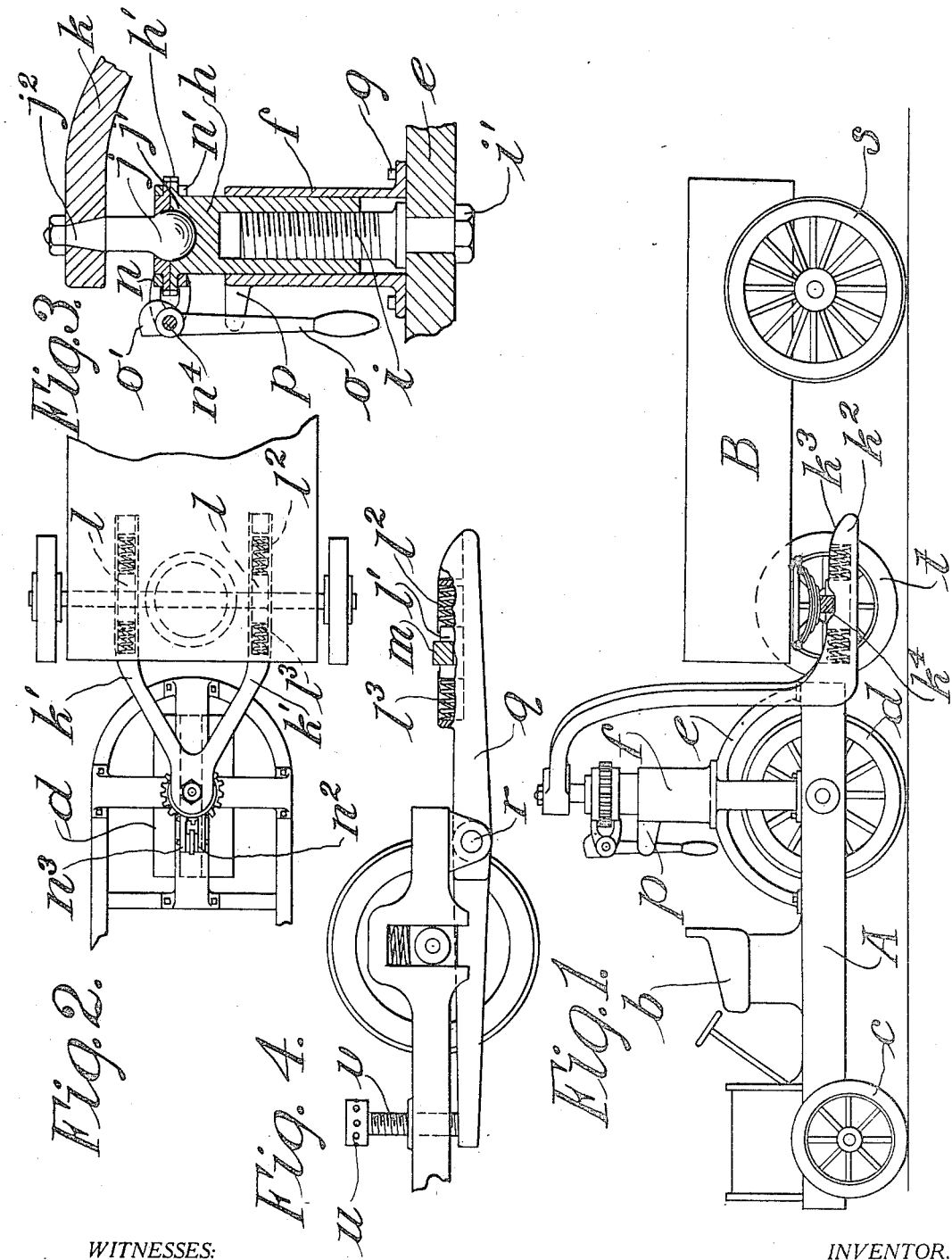

CHARLES H. MARTIN, OF WORCESTER, MASSACHUSETTS.

MOTOR-VEHICLE.

1,195,832.            Specification of Letters Patent.    Patented Aug. 22, 1916.

Application filed May 21, 1913. Serial No. 768,924.

*To all whom it may concern:*

Be it known that I, CHARLES H. MARTIN, a citizen of the United States, residing at Worcester, in the county of Worcester and State of Massachusetts, have invented certain new and useful Improvements in Motor-Vehicles, of which the following is a specification, reference being had to the accompanying drawings.

This invention relates to the combination of a tractor and a trailer in motor vehicles, and more particularly, to the tractor itself and devices whereby the tractor may be conveniently applied to vehicles of any known description.

My invention, in some of its broad features, concerns vehicles of the type shown in my Patent No. 1,018,248, for an improvement in vehicles, granted February 20, 1913.

It has, broadly, the same purpose as the machine illustrated in that patent—namely, the provision of a tractor which takes the place of a horse and can be applied to any vehicle; but in the operation of a tractor of the type covered in my prior patent, although this tractor may be applied at will to any vehicle, yet it is necessary in so applying it first to "jack" off the running gear portion attached to the vehicle from the corresponding portion attached to the tractor before the tractor may be removed from the vehicle. In other words, when the old tractor is used with a large number of vehicles and the separation is made between the two portions of the running gear (which has been found to be the most practical and convenient arrangement), it is necessary to manipulate the vehicle body by means of jacks or some other equivalent support whenever the tractor is removed therefrom, because as applied to vehicles in ordinary use the front wheels and front axle are removed from the vehicle, which is supported in front when being hauled upon the rear wheels of the tractor and when not being hauled upon jacks or other supports.

The principal and broad object of my invention is to provide in a tractor-trailer vehicle combination, a trailer with supporting and steering wheels, a steerable tractor for road or field use with a driving wheel or wheels at the rear, and lifting and connecting means associated with said tractor and trailer operable when positioned to connect the trailer steering wheel for turning movement with the tractor relatively to the trailer and operable while the connected tractor and trailer are stationary or moving to lift or lower said steering wheel from and to supporting contact with the ground, characterized in that the tractor may move the trailer forwardly or backwardly and turn in a narrow space and the weight on the driving wheel may at any time be increased and decreased as desired.

A more specific object of the invention is to provide a tractor with means thereon adapted to freely pass under and underlie the front axle of a trailer to be drawn by the tractor and mechanism associated with said means to connect the latter with the front axle of the trailer for hauling relatively turning and backing operations.

Other objects of the invention are to provide new and improved means for connecting a tractor and trailer for operation as will more particularly appear in the detailed description of the preferred embodiment of the invention and in the annexed claims.

In the drawings, Figure 1 is a side elevation of my tractor shown with a wagon attached and in its preferred form; Fig. 2 is a top plan view of Fig. 1; Fig. 3 is a detail of the elevating means in section; and Fig. 4 is a modification of the form of the invention shown in Figs. 1 to 3.

A represents the tractor in general provided with a seat $b$, fore wheels $c$, and a broad single tractor wheel $d$, which may be suitably tired or provided with a steel tread, just as desired. Mounted upon the frame A of the tractor is a four-legged spider $e$ which carries a casing $f$ bolted thereto at $g$, as shown in Fig. 3. Slidably mounted in the casing $f$ is an internally-threaded sleeve $h$ adapted to coöperate with an upright threaded shaft $i$ rigidly secured to the spider $e$ by means of the bolt $i'$. The sleeve $h$ carries at its solid upper end a mounting for the universal joint $j$ and $j'$, and secured upon the shank $j^2$ thereof, as shown in Fig. 3, is the depending arm $k$ having two downwardly-projecting portions $k'$ each provided with a backwardly-extending substantially horizontal extension $k^2$ having an inclined face $k^3$ and being provided upon its upper surface with a seat for the sliding blocks $l$. The blocks $l$ are each provided, in turn, with a recess $l'$ for the accommodation of the axle $m$ of a vehicle and are supported in seats in members $k^2$ by means of springs $l^2$—$l^3$. The portion of the extensions $k^2$ adjacent the mid-portion of the seats in these members above alluded to are cut away, as shown at $k^4$ (Fig. 1). Slidably mounted on the sleeve $h$ in straddled relation to the toothed flange $h'$, near the top thereof, is a revoluble collar $n$—$n'$ carrying a pair of lugs $n^2$—$n^3$ which support the gudgeon $n^4$ of the handle $o$ provided with a cam-wing $o'$, this handle being supported, as shown, within convenient reach of an occupant of the seat $b$ of the tractor and normally hanging in a slot in a lug $p$ integral with the casing $f$. The trailer member is here shown as a wagon B having rear wheels $s$ and fore wheels $t$.

In the operation of my new and improved device, by means of the handle $o$ the operator may rotate sleeve $h$. To do this, he simply raises handle $o$ until the cam-wing $o'$ takes into a space between the gear-teeth $h'$ and then turns sleeve $h$. The handle $o$ may be disengaged from the gear-teeth at any time, when it drops into the position in engagement with the lug $p$, as shown. Inasmuch as the pitch of the screw $i$ is small, a superimposed weight upon the sleeve $h$ is not sufficient to rotate it and it will remain in any adjusted position, or ratchets may be provided for this purpose. The preferred operation is as follows: The horizontal members $k^2$ are adjusted vertically so that the top surface thereof underlies the bottom surface of the trailer axle $m$. The tractor is then backed up to the trailer B so that the members $k^2$ pass freely below and underlie the axle $m$. The latter is preferably in vertical line with or in front of the slots $l'$. The operator now operates lever $o$ to turn the sleeve $h$ to raise the draw-bar members $k^2$ until they engage the axle $m$. The latter may be lifted so that the wheels leave the ground if desired, but this is not necessary. The tractor is then driven off and the axle $m$ settles in slots $l'$ when the members $k^2$ are drawn forwardly if it has not already settled therein when grappling members $k^2$ are raised. If desired the operation may be carried out in the following way: Assuming that the operator has adjusted sleeve $h$ in the manner just outlined and therefore the grappling element $k^2$ to the height required by the location of the fore axle of the vehicle which he contemplates drawing—the tractor is simply backed up to this vehicle (from which the tongue has, of course, been removed), the inclined faces $k^3$ then of the extensions $k^2$ take under the fore axle which slides along until it drops into the recesses $l'$ of the blocks $l$,—the slight necessary play for this purpose being accommodated by the supporting springs of the wagons. The cam faces $k^3$ as the tractor is backed under the trailer allow the axle $m$ of the latter to ride up the arms $k^2$ and fall into the slots $l'$ of the bars $k^2$. If one arm $k^2$ strikes the axle $m$ before the other, the turning of the axle $m$ will bring it against the other arm $k^2$. The tractor then backs under the axle $m$ which must fall into the slots $l'$ where it is supported and held when the tractor starts to pull. The tractor may then be driven to whatever point desired, the wagon following behind, but in case by reason of slippery streets, mud, or a hill, or any other reason, it is found desirable to increase the tractive force upon the propelling wheel $d$ of the tractor, the operator by manipulating the handle $o$ may raise the grappling element $k^2$ bodily, thereby not only relieving the wheels $t$ of the wagon of a portion or all of the weight of the wagon, but throwing this weight directly onto the propelling tractor wheel. This increase of the tractive force of the wheel may obviously be attained to any amount desired within the limits of the weight upon the fore wheels of the trailer. It is to be particularly noted that this increase in tractive force can be obtained when the tractor is moving or when it is stationary and just about to move. When the tractor is moving, if the structure renders an exceptionally large weight available rather than only a small part, then the possible "stalls" are cut down to a minimum. Where the traction wheels are on a slippery road or an analogous position, as on a grade, it is of the greatest importance to have sufficient weight available to increase the force of the traction wheels, for otherwise, it might be impossible to start the tractor. For this reason provision is made to use all of the weight available or any part of it at will. Moreover and above this possibility and as an advantage inherent in the modification shown in Fig. 1, it is obvious that the backward pull owing to the reluctance of the trailer tends to rotate member $j^2$ in a clockwise direction. This impulse is communicated through the sleeve $h$, casing $f$ and spider $e$ directly to the tractor frame so that the result is a tendency to turn the tractor bodily upon its rear axle as a pivot and to swing the engine and the weight of the whole fore part of the tractor off the ground, this exceptionally large weight, of course, going also to the tractor wheel. In other words, by this arrangement the tractive force is automatically augmented by an amount proportionate to the weight of the trailing body, and the proportion may be varied at the will of the operator.

The arrangement shown in Fig. 4, although shown in less detail, is the preferred form and is similar to that shown in Figs. 1 to 3. The frame A of the tractor has upon opposite sides a pair of depending lugs $r$ in which are pivotally mounted a pair of levers $q$, the rear ends of these levers being in all respects similar to the extensions $k^2$ described above, but the fore ends being connected and underlying at a common point the threaded screws *v* provided with an operating capstan member *u* for operation by the driver in a manner analogous to that in which handle *p* is operated in the other modification.

It is realized that many modifications of my invention can be made as soon as it is clearly understood. I, therefore, particularly point out and distinctly claim the various combinations of the elements of the invention and their functions.

Having now fully described my invention, but well knowing that many departures and modifications may be made thereof without departing from the real scope of the invention, which is more truly bounded and defined in the claims hereto appended, I claim,—

1. A tractor for trailer wagons, comprising, in combination, a frame having wheels and motor devices thereon to form an operable motor vehicle, means on the tractor constructed and arranged so that the tractor may be readily connected and disconnected with the front axle of a trailer wagon for hauling, relatively turning and backing operations with the trailer wagon, and mechanism to elevate said means operable when the tractor is stationary or moving.

2. A tractor for vehicles comprising, in combination, a frame, wheels and motor devices thereon, means for automatically engaging a trailer, and means for elevating said means, said elevating means being under the control of the operator from the seat of the tractor.

3. In combination an operable motor tractor, a separately operable trailer wagon having a front steering wheel and axle, means on the tractor operable to be readily attached and detached with said front steering axle of the trailer wagon and mechanism on the tractor to operate said means to lift the said steering axle, characterized in that the steering axle of the trailer may be connected at will to the tractor for turning movement therewith relatively to the trailer.

4. In a tractor having a rear wheel and in combination with a trailer, a support adjacent the rear wheel of the tractor, a vertically-movable member mounted on the support, an arm operable by said vertically-movable member and adapted for automatic engagement with a trailer.

5. In an apparatus of the class described including a tractor frame and a rearwardly-projecting arm adapted to grapple the trailer and provided with a cam end whereby said arm automatically grapples the trailer when the tractor is backed thereto, and means for vertically moving the arm.

6. In combination an operable motor tractor, a separately operable trailer wagon having a front steering wheel and axle, supporting and connecting means on the tractor constructed and arranged to be readily attached and detached with said front steering axle of the trailer wagon and adjustable lifting mechanism on the tractor for said supporting means whereby the pressure of the tractor wheel upon the ground may be increased and decreased at will while the tractor is stationary or moving.

7. In a tractor and trailer combine, a tractor, steering and traction wheels thereon, means pivoted adjacent the rear wheel and adapted to connect with an axle of the trailer when backed thereto, and mechanism on the tractor operable to move said means to disconnect the tractor and trailer.

8. In a tractor and trailer combine, a tractor having wheels thereon arranged to remain on the ground at all times, connecting means on said tractor adapted to reach under a steering axle of the trailer when the tractor is backed relatively thereto, together with means for elevating said means and thus connect the tractor with a trailer.

9. In a tractor and trailer combine, a rear vehicle including a front and a rear axle, a tractor, means on the tractor for engaging the front axle of the trailer when the tractor is backed relatively thereto and mechanism for elevating said means whereby the front axle of the trailer is lifted.

10. A tractor, vertically movable means mounted thereon adapted to freely pass under and underlie an axle of a trailer to be drawn by the tractor, said means being constructed and arranged so that when raised into engagement with an axle it bears against portions thereof at each side of the center, and mechanism operable to raise and lower said means when the tractor is stationary or moving.

11. In combination a tractor having traction and steering wheels thereon, and a trailer having a fore and rear axle with wheels thereon, means to connect the two for operation, comprising, a device on the tractor for readily attachable and detachable supporting engagement with an axle of the trailer, and mechanism under the control of the operator when the tractor is stationary or moving, to move said device whereby it may directly support a desired part of the trailer weight, said mechanism being constructed and arranged so that the weight so supported may be varied at will.

12. In combination, a tractor and trailer, a connecting draw bar member pivoted on the tractor and adapted to overlap an axle of the trailer, mechanism on the tractor, operable at will, to swing said member into engagement with said axle of the trailer to which it can connect and which it overlaps, and thus connect the two for operation.

13. In combination, a tractor and trailer, a draw bar member on the tractor adapted to freely overlap an axle of the trailer, mechanism on the tractor, operable at will, to move said member into operable engagement with said axle of the trailer which it overlaps, whereby the tractor is connected to the trailer for operation.

14. A tractor comprising in combination, a frame having wheels and motor devices mounted thereon, means mounted on the frame adapted to freely pass under and underlie an axle of a trailer to be drawn by the tractor, mechanism on the tractor, constructed to elevate said first mentioned means when the tractor is stationary or moving and through it to connect the tractor and trailer for operation.

15. The combination of a steerable tractor mounted on rear traction and front steering wheels adapted for short turns, a trailer with a front axle supporting the front end thereof and also adapted for short turns, lifting mechanism on the tractor constructed and arranged to be readily attached to and detached from said front axle whereby the tractor, connected or disconnected with the trailer may operate forwardly or backwardly and turn in a narrow space.

16. In combination, a tractor, a trailer, a cross member under the front end of the trailer and connected to the latter to turn about a vertical axis, means on the tractor for operable connection with said member on each side of its vertical axis, and mechanism located on the tractor to make said connection at will, including operable means for moving said mechanism.

17. The combination of a steerable tractor adapted for short turns, a trailer with means supporting the front end thereof and also adapted for short turns, mechanism on the tractor arranged for detachable supporting engagement with said means, and a device for operating said mechanism whereby so much as desired of the weight of the trailer may be thrown upon the tractor, all constructed and arranged so that the tractor may operate the trailer forwardly or backwardly and turn in a narrow space.

18. A tractor-trailer vehicle combination, comprising a trailer having wheels at the rear and a steering wheel or wheels connected to the trailer by means swiveled at the front end thereof, a tractor having a driving wheel at the rear and a steering wheel or wheels at the front thereof, and lifting and connecting means associated with said tractor and trailer operable when positioned to connect said trailer steering wheel for turning movement with the tractor relatively to the trailer and operable while the connected tractor and trailer are stationary or moving to lift or lower said wheel from and to supporting contact with the ground characterized in that the tractor may move the trailer forwardly or backwardly and turn in a narrow space and the weight on the driving wheel may be increased and decreased as desired.

19. In combination an operable motor tractor, a separately operable trailer wagon having two axles with supporting wheels thereon, means on the tractor constructed and arranged for horizontal turning movement with respect to the tractor and adapted to be readily connected with the front axle of the trailer wagon for hauling, turning, and backing operations, said means adapted also to be readily disconnected from the axle and mechanism on the tractor to lift said means whereby the wheels of the axle engaged may be raised from the ground.

CHARLES H. MARTIN.

Witnesses:
SEBASTIAN HINTON,
MINNIE A. HUNTER.